(12) United States Patent
Schulz et al.

(10) Patent No.: US 12,253,168 B2
(45) Date of Patent: Mar. 18, 2025

(54) LOCK ACTUATOR, AND PARK LOCK COMPRISING SUCH A LOCK ACTUATOR

(71) Applicant: KENDRION (VILLINGEN) GMBH, Villingen-Schwenningen (DE)

(72) Inventors: Florian Schulz, Brigachtal (DE); Andreas Kammerer, Obereschach (DE); Mikhail Revin, Villingen-Schwenningen (DE); Rolf Hermann, Königsfeld (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 0 days.

(21) Appl. No.: 17/312,506

(22) PCT Filed: Oct. 14, 2019

(86) PCT No.: PCT/EP2019/077826
§ 371 (c)(1),
(2) Date: Jun. 10, 2021

(87) PCT Pub. No.: WO2020/119980
PCT Pub. Date: Jun. 18, 2020

(65) Prior Publication Data
US 2022/0128146 A1 Apr. 28, 2022

(30) Foreign Application Priority Data
Dec. 13, 2018 (DE) .......................... 102018132182.1
Feb. 21, 2019 (EP) ...................................... 19158621

(51) Int. Cl.
*F16H 63/34* (2006.01)
*B60T 1/00* (2006.01)
*F15B 15/26* (2006.01)

(52) U.S. Cl.
CPC .......... *F16H 63/3475* (2013.01); *B60T 1/005* (2013.01); *F15B 15/261* (2013.01); *F16H 63/3483* (2013.01)

(58) Field of Classification Search
CPC ....... B60T 1/005; F16H 63/3458–3475; F16H 63/3483; F15B 15/261
See application file for complete search history.

(56) References Cited

U.S. PATENT DOCUMENTS 4,295,413 A * 10/1981 Kamimura ............ F15B 15/261
                                                    92/24
4,789,366 A   12/1988 Hale et al.
(Continued)

FOREIGN PATENT DOCUMENTS

CN      204041981 U    12/2014
DE       4332948 A1     3/1996
(Continued)

OTHER PUBLICATIONS

Office Action dated Oct. 8, 2021 issued in corresponding European Application No. 19158621.3.
(Continued)

*Primary Examiner* — James J Taylor, II
(74) *Attorney, Agent, or Firm* — Nath, Goldberg & Meyer; Jerald L. Meyer

(57) ABSTRACT

A vehicle park lock actuator is arranged in a longitudinal axis and has a movable actuating element which is movable into a first position and a second position. A locking slotted guide, and a locking element is held displaceably perpendicular to the longitudinal axis and has a first surface and a second surface at a different distance from the longitudinal axis, and connected by a wedge surface with a gradient. The first surface is in operative contact with the locking element in the first position and a second surface is in operative contact with the locking element in the second position. At
(Continued)

least the first surface and/or the second surface is inclined in relation to the wedge surface.

12 Claims, 5 Drawing Sheets

(56) References Cited

U.S. PATENT DOCUMENTS

| | | | | |
|---|---|---|---|---|
| 6,823,976 | B2* | 11/2004 | Schmid | F16H 63/3475 |
| | | | | 192/219.5 |
| 9,383,012 | B2* | 7/2016 | Popp | F16H 63/3416 |
| 2015/0159752 | A1 | 6/2015 | Popp et al. | |
| 2016/0061325 | A1 | 3/2016 | Hill et al. | |

FOREIGN PATENT DOCUMENTS

| | | | | |
|---|---|---|---|---|
| DE | 102005013661 A1 | | 11/2005 | |
| DE | 102006039862 A1 | | 3/2008 | |
| DE | 102007000637 A1 | * | 5/2008 | ............ F15B 15/261 |
| DE | 102012021221 A1 | | 4/2014 | |
| EP | 2458226 A1 | * | 5/2012 | ............ F15B 15/261 |
| KR | 100989042 B1 | | 10/2010 | |
| KR | 20140126112 A | * | 10/2014 | |
| WO | 02/10619 A1 | | 2/2002 | |

OTHER PUBLICATIONS

German office action dated Oct. 23, 2019, from corresponding application DE 102018132182.1.

European office action dated Sep. 11, 2019, from corresponding application EP 19158621.3.

Office Action in parallel Chinese patent application No. 201980081861.8 issued Sep. 20, 2022.

Office action issued Feb. 23, 2023, for parallel pending European patent application No. 19786334.3.

Office action issued Jun. 8, 2023, in parallel pending Brazilian patent application No. BR112021006564-4, with English abstract.

* cited by examiner

LOCK ACTUATOR, AND PARK LOCK COMPRISING SUCH A LOCK ACTUATOR

CROSS-REFERENCE TO RELATED APPLICATIONS

This is a National Phase Application filed under 35 U.S.C. 371 as a national stage of PCT/EP2019/077826, filed Oct. 14, 2019, an application claiming the benefit of German Application No. 10 2018 132 182.1 filed Dec. 13, 2018, and European Application 19158621.3 filed Feb. 21, 2019, the content of each of which is hereby incorporated by reference in its entirety.

FIELD

The present invention relates to a lock actuator with an electromechanically movable and actuatable actuating element, which can be moved into a first position and a second position, and a park lock with such a lock actuator for locking a transmission, in particular for locking an automatic transmission of a motor vehicle with a park lock.

BACKGROUND

Park locks are previously known from prior art in different configurations and are usually used to actuate a mechanically acting locking device, by means of which the transmission of a motor vehicle, in particular the automatic transmission of a motor vehicle, can be blocked. For this purpose, the park lock can be moved into a first position which releases the transmission and a second position which locks the transmission, in which, for example, a pawl or a bolt engages a ratchet wheel of the automatic transmission and thus mechanically blocks the automatic transmission in a parking position.

To actuate the park lock, different electro-hydraulic park locks are proposed in prior art, which are characterized in that the park lock is preloaded on the one hand, for example by means of a spring accumulator, and the park lock can be unlocked by means of a hydraulically operated cylinder or piston, wherein a locking device is provided by which an unintentional actuation of the park lock is prevented. The locking device typically comprises a locking slotted guide, by means of which at least one locking element can be displaced into a position that locks the cylinder or releases the cylinder. The at least one locking element engages positively in a latching link of the cylinder.

It has been found to be disadvantageous in prior art that the park locks known from prior art have a complex construction and require a high hydraulic pressure for actuation on the one hand, and a large force to mechanically release or close the park lock on the other. In prior art, different locking devices have proven themselves, but it has been found that great forces are necessary to release the locking device, since the at least one locking element is often jammed with the locking slotted guide and the latching link. As a result, the park locks known from prior art are not only of considerable weight but also of a size that is not to be neglected.

SUMMARY

This is where the present invention starts.

It is therefore the object of the present invention to propose an improved lock actuator, in particular for a park lock, a parking brake with a lock actuator with a smaller size and a lower weight, which is particularly energy-efficient and reliable for locking a cylinder of a park lock for a transmission, especially an automatic transmission of a motor vehicle, and enables cost savings in the manufacturing process with simple and reproducible processes at the same time. In particular, a new design of the lock actuator should be made particularly light and energy-efficient in order to reduce the forces required to lock or unlock the cylinder, so that smaller and lighter lock actuators can be used.

These objects are achieved an electromagnetic lock actuator with for a vehicle park lock, comprising an electromechanically movable and actuatable actuating element, which can be moved into a first position and into a second position and comprising a locking slotted guide. The locking slotted guide is designed as a sleeve, and that the sleeve is arranged on the actuating element. At least one locking element is held displaceably relative to the locking slotted guide.

The lock actuator, in particular the lock actuator is arranged in a longitudinal axis and comprises a movable and actuatable actuating element that can be moved into a first position and a second position and has a locking slotted guide. In addition, the lock actuator according to the invention comprises at least one locking element which is held displaceably relative to the locking slotted guide, wherein the locking slotted guide has a first surface and a second surface, which are connected to a first gradient by a wedge surface, and wherein the first surface in the first position and the second surface in the second position are in operative contact with the at least one locking element. Accordingly, the at least one locking element is advanced by the locking slotted guide depending on the position of the movable actuating element, with the at least one locking element particularly preferably being displaceable perpendicular to the longitudinal axis through the locking slotted guide. The first surface and the second surface are also preferably formed at a different distance from the longitudinal axis of the lock actuator, whereby the distance between the first surface and the second surface inevitably predetermines an adjustment path of the at least one locking element. According to the invention, it is further provided that the at least one first surface and/or the second surface is/are inclined in relation to the wedge surface with a second gradient.

For the purposes of this disclosure, a gradient is used as a mathematical measure for the steepness of the wedge surface or the first and/or the second surface.

The basic idea of this embodiment of the lock actuator according to the invention is based on the idea of reducing the force required to actuate the actuating element in the first position and/or the second position by inclining the first surface and/or the second surface in order to use a smaller and more energy-efficient, and possibly faster actuator for actuating the actuating element of the lock actuator according to the invention, which results in a considerable reduction in weight and more energy-efficient operation of both the lock actuator and the park lock with such a lock actuator.

An advantageous development of the present invention provides that the first gradient M1 of the wedge surface is larger in magnitude than the second gradient M2 of the at least one first surface and/or the second surface, namely $|M1|>|M2|$. $|M1|>|2*M1|$ is preferred. Accordingly, the absolute gradient $|M1|$ of the wedge surface is preferably always at least twice as large as the absolute second gradient $|M2|$ of the first surface and/or the second surface, i.e. $|M1| \geq 2*|M2|$, whereby it is ensured that, when the actuating element is actuated from the first position to the second position, the at least one locking element is advanced within a short distance and that the at least one locking element in the first position and/or the second position generates a sufficient holding force, and the actuating force required to release the holding force on the actuating element is as small as possible.

According to a further advantageous embodiment of the present invention, it is provided that the gradient of the wedge surface and the second gradient of the first surface and/or the second surface point in the same direction.

According to the invention, it is immaterial in which position the first surface, the second surface and the wedge surface are arranged in relation to the longitudinal axis. In particular, an arrangement is preferred in which the first surface, the second surface and the wedge surface are arranged in a plane perpendicular to the longitudinal axis or in an arrangement parallel to the longitudinal axis. The first gradient and the second gradient can be calculated for the above-mentioned possibilities by means of the change in the radius in relation to the change in the polar angle around the longitudinal axis ($M_i = \Delta r / \Delta \varphi$) or by means of the change in the radius in relation to the change along the longitudinal axis ($M_i = \Delta r / \Delta x$). The gradient of the wedge surface and the second gradient of the first surface and/or the second surface always point in the same direction if the mathematical signs are identical.

Furthermore, it is advantageous if the actuating element can be moved linearly in the longitudinal axis or if the actuating element can be rotated about the longitudinal axis. The actuating element can, for example, be a tappet that can be moved and actuated linearly along the longitudinal axis or a sleeve that can be rotated and actuated about the longitudinal axis. The actuating element is preferably a tappet, whereby a very compact structure can be realized.

A further advantageous embodiment provides that the lock actuator is an electromagnetic lock actuator, and that the actuating element can be actuated electromagnetically. In particular, it is preferred if the lock actuator comprises an electromagnetic stroke actuator or an electromagnetic rotary magnet, the electromagnetic lock actuator having a starting position and an end position, and the starting position corresponds to the non-actuated or de-energized state of the lock actuator, and the end position corresponds to an actuated or energized state of the lock actuator.

In addition, it is advantageous if a return spring is provided, and the return spring holds the actuating element in the preloaded starting position in the first position or the second position. The return spring is thus configured to hold the locking elements preloaded, either in the first position or the second position, by means of the locking slotted guide. The spring is preferably configured in such a way that the locking slotted guide holds the locking elements in the position that locks the cylinder of the park lock.

A further advantageous embodiment of the present invention provides that the first surface or the second surface is inclined, the one surface being inclined from the first surface or the second surface, which is in operative contact with the at least one locking element in the actuator starting position.

In addition, it has proven to be advantageous if an actuator housing is provided and if the actuating element and/or the at least one locking element are or is mounted in the actuator housing. Furthermore, it is preferred if the actuator housing projects with a housing section in areas along the longitudinal axis into a cylinder of the park lock, the cylinder of the park lock is linearly guided on the housing section.

A further advantageous embodiment of the present invention provides that the locking slotted guide is designed as a sleeve, and that the sleeve is arranged on the actuating element. It is particularly preferred if the locking slotted guide is held preloaded as a sleeve on the actuating element by means of the return spring, which results in a particularly simple and compact design of the lock actuator according to the invention.

Furthermore, it has proven to be advantageous if the at least one locking element of a latching link is a locking pin.

Another aspect of the present invention relates to a park lock, in particular for use in a motor vehicle with an automatic transmission, with a lock actuator and a cylinder or piston which is movable in the longitudinal axis and which is set up to lock the automatic transmission, wherein the cylinder comprises a latching link with which the at least one locking element can engage in the first position or the second position of the actuating element. In a preferred embodiment, the cylinder or piston can be guided in a cylinder housing along the longitudinal axis, the cylinder housing furthermore preferably being made from a plastic.

The lock actuator of the park lock comprises a movable and actuatable actuating element, which can be moved into a first position and a second position and has a locking slotted guide. In addition, the lock actuator according to the invention comprises at least one locking element which is held displaceably relative to the locking slotted guide, wherein the locking slotted guide has a first surface and a second surface, which are connected to a first gradient by a wedge surface, and wherein the first surface in the first position and the second surface in the second position are in operative contact with the at least one locking element. The at least one locking element is advanced by the locking slotted guide depending on the position of the movable actuating element, with the at least one locking element particularly preferably being displaceable perpendicular to the longitudinal axis through the locking slotted guide. The first surface and the second surface are also preferably formed at a different distance from the longitudinal axis of the lock actuator, whereby the distance between the first surface and the second surface inevitably predetermines an adjustment path of the at least one locking element. Furthermore, it can be provided according to a further development that the at least one first surface and/or the second surface is/are inclined in relation to the wedge surface with a second gradient.

The cylinder housing or piston housing can be connected to the actuator housing with a metal-plastic connection at a connection point, the metal-plastic connection being formed by molding the cylinder housing onto the actuator housing or by ultrasonic welding.

A further development of the park lock provides that the latching link has at least one notch, and that the at least one notch is formed by at least one surface. Furthermore, the at least one surface can have two contact areas, where the locking element contacts the notch when the locking element engages in the notch, the two contact areas being arranged at a distance from a line which protrudes perpendicularly from the longitudinal axis and which passes through a geometric center of the locking element. In the exclusively two contact areas, the locking element ideally contacts the notch point-by-point and is pressed against the notch, the vector of the resulting force vectors in the contact area pointing neither perpendicular to the longitudinal axis nor parallel to the longitudinal axis, but at an angle of between 5° and 85°, preferably 15°-75°, more preferably 30°-60° and even more preferably 45°±5° to the longitudinal axis.

A notch in the latching link can be curved or U-, V- or trapezoid-shaped and prevents the locking element from becoming tilted or jammed when the park lock is unlocked by means of the lock actuator. The force required to release the locking device is also reduced, as a result of which less current is required for unlocking.

It has also proven to be advantageous if two contact areas are arranged in the longitudinal axis (X-X) on opposite sides of the point, preferably symmetrically. In the event that the locking element is at least partially circular or spherical, a connecting line between the two contact areas is a secant and the distance between the two contact areas is smaller than a diameter and is at least 1/20 of the diameter.

Another and final aspect of the present invention relates to a motor vehicle with an automatic transmission which has at least one park lock with a lock actuator according to the invention.

BRIEF DESCRIPTION OF THE DRAWINGS

An exemplary embodiment of the present invention according to the invention and a further development thereof are explained in detail below with reference to the accompanying drawings. In the drawings.

DETAILED DESCRIPTION

Figure 1:
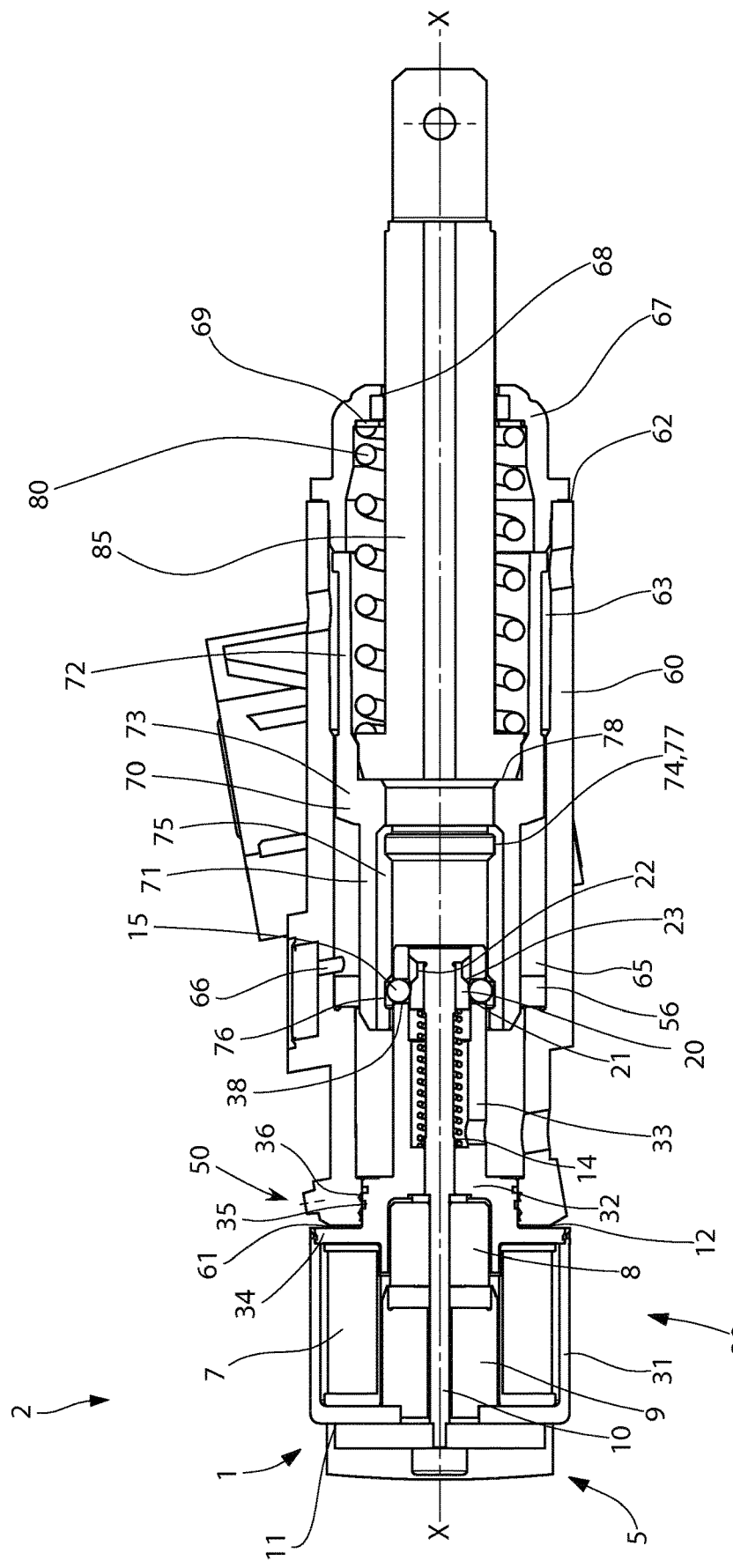
FIG. 1 is a schematic sectional view of a park lock of a motor vehicle with a lock actuator according to the invention, wherein a cylinder of the park lock is fixed in a first position by the lock actuator.
Figure 2:
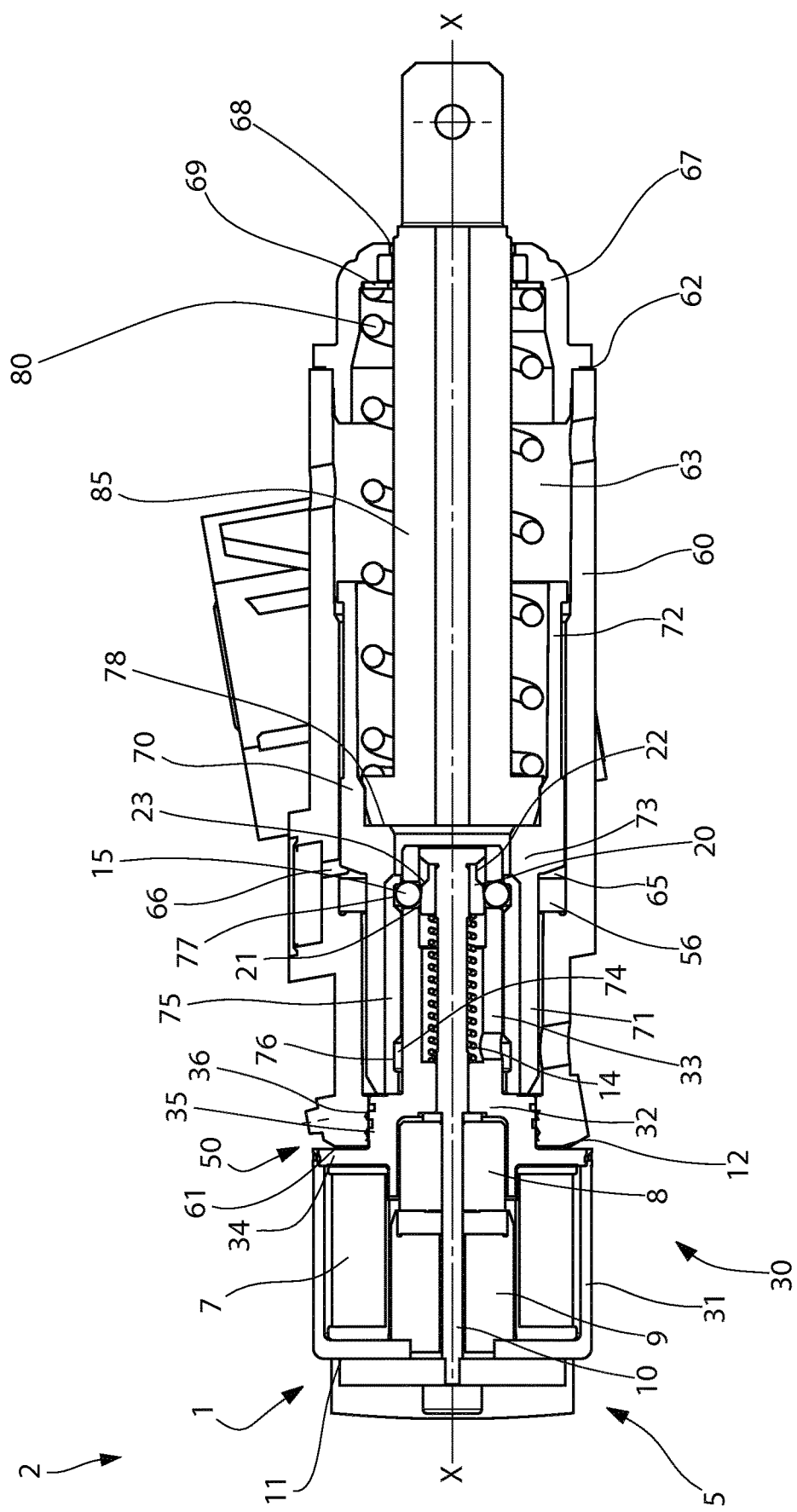
FIG. 2 is a schematic sectional view of a park lock according to FIG. 1, wherein the cylinder of the park lock is fixed in a second position by the lock actuator.

FIGS. 1 and 2 show a park lock 2 according to the invention with a lock actuator 1 and a cylinder 70 or piston 70 arranged in a cylinder housing 60 and movably arranged in the cylinder housing 60 in a longitudinal axis X-X.

The cylinder 70 of the park lock 2 can be shifted along a longitudinal axis X-X between a first position (see FIG. 1) and a second position (see FIG. 2) in order to mechanically lock a transmission (not shown), in particular an automatic transmission of a motor vehicle. The first position of the cylinder 70 can correspond to the position of the cylinder 70 locking the transmission and the second position B can correspond to the position of the cylinder 70 releasing the transmission, or vice versa.

The lock actuator 1 is arranged on the longitudinal axis X-X and has a first side 11 and a second side 12, the second side 12 facing the cylinder 70 and the cylinder housing 60 and the first side 11 forming the free end of the lock actuator 1.

The lock actuator 1 comprises an electromagnetic actuator 5, a coil 7 that can be energized, an armature 8, an actuating element 10, a locking slotted guide 20, a return spring 14, a pole cover 9 and an actuator housing 30.

The electromagnetic actuator 5 is designed in the manner of a single solenoid which, by means of an electromagnetic force action of the energized coil 7, causes a linear movement of the armature 8 and an actuating element 10 connected to the armature 8 in the longitudinal axis X-X from an actuator starting position—which is shown in FIGS. 1 and 2—into an actuator end position (not shown). The return takes place through the spring force of the return spring 14. The actuator starting position corresponds to a first position A of the actuating element 10 and the actuator end position corresponds to a second position B of the actuating element.

The actuator housing 30 of the lock actuator 1 comprises a first housing section 31 and a second housing section 32, the first housing section 31 closing the first side 11, i.e., the free end of the lock actuator 1, and the second housing section 32 being arranged on the side of the lock actuator 1 facing the cylinder housing 60. The first housing section 31 and the second housing section 32 are each made in one piece from a magnetic and metallic material and serve to guide the magnetic flux that results from energizing the coil 7.

The second housing section 32 furthermore comprises a flange 34, a shoulder 35 that forms a cylinder lateral surface and a housing sleeve 33 protruding from the second side.

The actuating element 10 is connected to the armature 8 and is mounted at one end on the first side 11 of the electromagnetic actuator 5 in a through hole in the pole cover 9 and at the other end in the second housing section 32 or in the housing sleeve 33 molded onto the second housing section 32.

When the coil 7 is energized, the armature 8 together with the actuating element 10 is moved from the stroke start position along the longitudinal axis X-X against the force of the return spring 14. The return spring 14 is supported at one end in the actuator housing 30 or in the housing sleeve 33 of the second housing section 32 and at the other end on a free end, which is arranged on the second side and which is provided with a flange. The armature 8 is held in the second housing section 32 for a flux transition both in the actuator starting position and in the actuator end position, the pole cover 9 and the armature 8 being spaced apart in the actuator starting position. In the actuator end position, the air gap between the armature 8 and the pole cover 9 is closed, with a sleeve-shaped section being formed on the side of the pole cover 9 facing the armature 8, which is designed to encompass the armature 8 in the actuator end position.

It can be advantageous for the sleeve-shaped section to be designed as a control cone. The free end of the sleeve-shaped section can be arranged approximately in a plane perpendicular to the longitudinal axis X-X on the end of the armature 8 facing the pole cover 9. Furthermore, the free end of the sleeve-shaped section is arranged at a distance from the second housing section 32.

The lock actuator 1 is set up to lock the piston-shaped cylinder 70 in the first position—see FIG. 1—and in the second position—see FIG. 2. For this purpose, the at least one locking element 15 and the locking slotted guide 20 are arranged on the second side 12 of the lock actuator 1 facing the cylinder 70. For this purpose, the locking slotted guide 20 is coupled to the actuating element 10, the locking slotted guide being set up to advance the at least one locking element 15 for fixing or locking the cylinder 70 in the first position or the second position—as will be explained in detail below.

The cylinder housing 60 is made of a plastic and has a through opening 63 that is coaxial with the longitudinal axis X-X and extends between a first side 61, which faces the electromagnetic actuator 5, and a second side 62. In the through opening 63, the cylinder 70 is movably arranged in the longitudinal axis X-X.

The cylinder housing 60 is firmly connected to the actuator housing 30 at a connection point 50, the cylinder housing 60 in the illustrated preferred exemplary embodiment being pushed onto the first housing section 31 via a cylinder lateral surface of the shoulder 35 until the first side 61 of the cylinder housing 60 lies against the end face of the flange 34. Alternatively, a gap can be formed between the cylinder housing 60 and the end face of the flange 34, which can serve to compensate for tolerances.

A metal-plastic connection is then produced between the actuator housing 30 and the cylinder housing 60, the metal-plastic connection being particularly preferably produced by an ultrasonic welding process. Alternatively, the cylinder housing 60 can be molded directly onto the actuator housing 30 in a forming process, in particular injection molding.

In order to give the metal-plastic connection a particularly good strength, both the end face of the flange 34 and the cylinder lateral surface of the shoulder 35 can be provided with a surface enlargement, for example a corrugation or at least one undercut 36, whereby in particular high axial forces along the longitudinal axis X-X can be transmitted via the metal-plastic connection.

The cylinder 70 is formed in one piece from essentially two tubular sections and can be produced from a plastic, preferably in an injection molding process. The first tubular section 71 and the second tubular section 72 are connected to one another in a transition region 73.

The first section 71, together with the transition region 73 and the cylinder housing 60, encloses a pressure chamber 65 which can be closed in a liquid-tight and airtight manner by means of seals 56. Furthermore, the first section 71 engages in a hollow-cylindrical cavity enclosed between the housing sleeve 33 and the cylinder housing 60, so that the first section 71 is guided linearly on the housing sleeve 33 on the one hand and on the cylinder housing 60 on the other.

The cylinder housing 60 can have at least one control opening 66, through which a medium can be introduced into the pressure chamber 65 in order to move the cylinder 70 against the spring force of a compression spring 80 from the first position to the second position along the longitudinal axis X-X. The cylinder 70 is thus a single-acting cylinder.

The cylinder 70 is guided in the first tubular section 71 on the housing sleeve 33, the first tubular section 71 having a sliding bush 75 through which the cylinder 70 is linearly slide-mounted on the housing sleeve 33. The sliding bush 75 can be made of a metallic material and the cylinder 70 is particularly preferably overmolded onto the sliding bush 75, whereby the latter is held in a form-fitting manner on the inner lateral surface of the first tubular section 71 of the cylinder 70. The sliding bush 75 comprises a first notch 76 and a second notch 77, which are spaced apart from one another in the longitudinal axis X-X and form a latching link 74. The distance between the first notch 76 and the second notch 77 corresponds to the stroke of the cylinder 70 between the first position according to FIG. 1 and the second position according to FIG. 2.

On the side of the transition region 73 facing away from the first tubular section 71, a spring shoe 78 is formed within the second tubular section 72. A park lock tappet 85 is supported on the spring shoe 78, the compression spring 80 holding the park lock tappet 85 pressed against the spring shoe 78 in the longitudinal axis X-X.

The second side 62 of the cylinder housing 60 is closed by means of a cover 67, which has a through opening 68, through which the park lock tappet 85 can be guided toward the transmission. A sliding element, which supports the park lock tappet 85, can be arranged in the through opening 38.

The sliding element can be made of any material, for example metal or PTFE, and can preferably be pressed into a corresponding recess in the cover 67, glued or fastened to the cover 67 in some other way.

The compression spring 80 can be held preloaded by means of a spring plate 69 between the park lock tappet or the spring shoe 78 and the spring plate 69 or the cover 67, so that, when pressure is applied to the pressure chamber 65, the cylinder 70 is moved from the first position A to the second position B in the longitudinal axis X-X against the spring force of the compression spring 80.

The lock actuator 1 fixes the cylinder 70 in the first position or the second position, the lock actuator 1 being able to fix or release the cylinder 70 by means of the locking slotted guide 20 coupled to the actuating element 10 and the at least one locking element 15.

For this purpose, the at least one locking element 15 is designed as a locking ball and is held in a recess 38 in the housing sleeve 33 or the second housing section 32 and is movably supported in the recess 38 substantially perpendicular to the longitudinal axis X-X. The recess 38 can have a cylindrical shape perpendicular to the longitudinal axis X-X and can correspond to the shape of the at least one locking element 15 in such a way that the locking element 15 is held in the recess 38, so that it can move easily perpendicular to the longitudinal axis X-X. In particular it can be seen on the enlarged illustration in FIG. 3 that the recess 38 has a retaining edge 39 on the side facing away from the locking slotted guide 20, by means of which the recess 38 is tapered on the one facing the latching link 74. The retaining edge 39 is set up in such a way as to prevent the relevant locking element 15 from falling out of the recess 38, in particular during the assembly of the lock actuator 1 according to the invention or the park lock 2 according to the invention. Depending on the position of the cylinder 70, the at least one locking element 15 can engage in the first notch 76 or in the second notch 77 of the latching link 74 and thereby fix the position of the cylinder 70 relative to the actuator housing 30.

The locking slotted guide 20 can be arranged fixedly on the actuating element 10 and comprises a first surface 21, a wedge surface 23 and a second surface 22.

Figure 3:
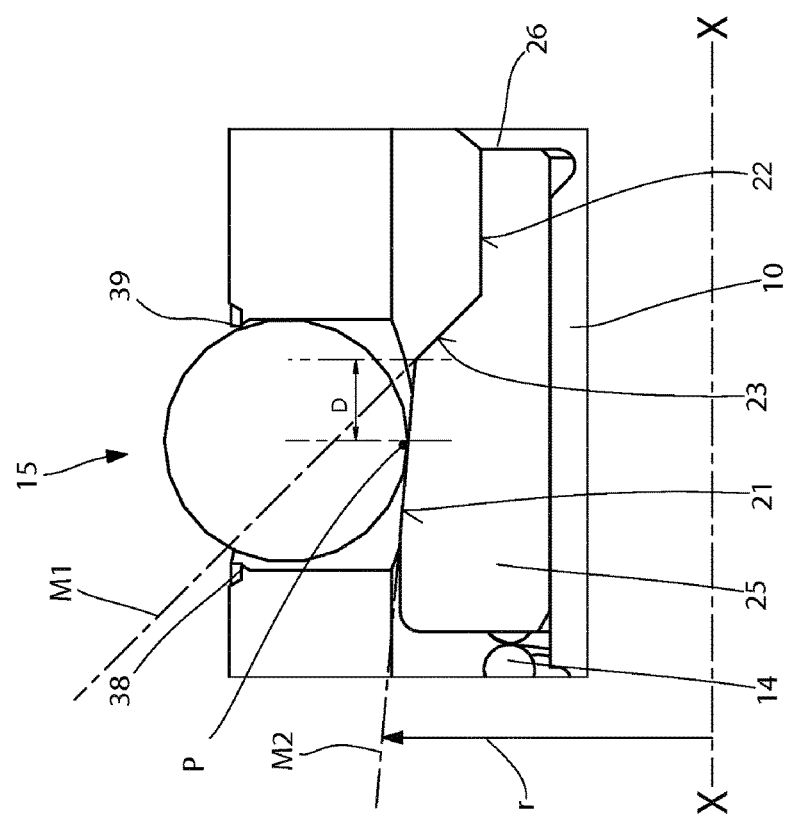
FIG. 3 shows an enlarged illustration of the lock actuator according to the invention according to FIG. 1 or 2 with an actuating element and a locking slotted guide arranged on the actuating element, which is set up to provide the at least one locking element for locking the cylinder of the park lock.

The enlarged illustration in FIG. 3 shows that the wedge surface 23 connects the first surface 21 to the second surface 22 and has a gradient M1. The diameters of the first surface 21 and the second surface 22 are dimensioned differently. When the first surface 21 is in operative contact with the locking element 15, the locking element 15 engages in the relevant notch 76, 77. If, on the other hand, the second surface 22 is in operative connection with the locking element 15, the locking element 15 can leave the relevant notch 76, 77 and a movement of the cylinder 70 in the longitudinal axis X-X is enabled.

The first surface 21 is inclined in relation to the wedge surface 23 with a second gradient M2, whereby the first surface 21, in contrast to the second surface 22, is not a cylinder lateral surface, but is conical with the second gradient M2.

The gradient M1 of the wedge surface 23 is always larger in magnitude than the second gradient M2, the first gradient M1 preferably being at least twice as large as the second gradient M2 of the first surface 21. In the exemplary embodiment shown, the second gradient M2 is approximately one tenth of the gradient M1, that is to say approximately $10*M2 \approx M1$, the second gradient M2 also being up to $\frac{1}{25}*M1$ and less. The gradient M1 and the second gradient M2 correspond to the mathematical gradient of a curve or line and are calculated in the illustrated embodiment using the change in the radius of the wedge surface 23 or the first surface 21 along the longitudinal axis X-X, i.e., M1=Δr/Δx or M2=Δr/Δx. The mathematical sign, i.e., plus (+) or minus (−), of the gradient M1 and the second gradient M2 is the same. Accordingly, the first surface 21 and the wedge surface 23 are inclined in the same direction.

The second gradient M2 of the first surface 21 can preferably be selected such that the locking element 15 and the locking slotted guide 20 cannot be moved in the position A against the spring force of the return spring 14. When the cylinder 70 is loaded with an axial load force, the force required to adjust the actuating element 10 is significantly reduced by the second gradient M2 of the first surface 21. Consequently, the electromagnetic actuator 5 can be made smaller.

In position A, the locking element 15 or the locking elements 15 rest at a contact point P on the first surface 21, the contact point P being arranged at a distance D from the wedge surface 23. The distance D can be 2 mm≥D≥0.25 mm, preferably approximately 1 mm, the distance D being related to a transition edge between the wedge surface 23 and the first surface 21.

The locking slotted guide 20 can be placed as a sleeve 25 on the actuating element 10 and held against a flange 26 of the actuating element 10 by means of the return spring 14.

Figure 4:
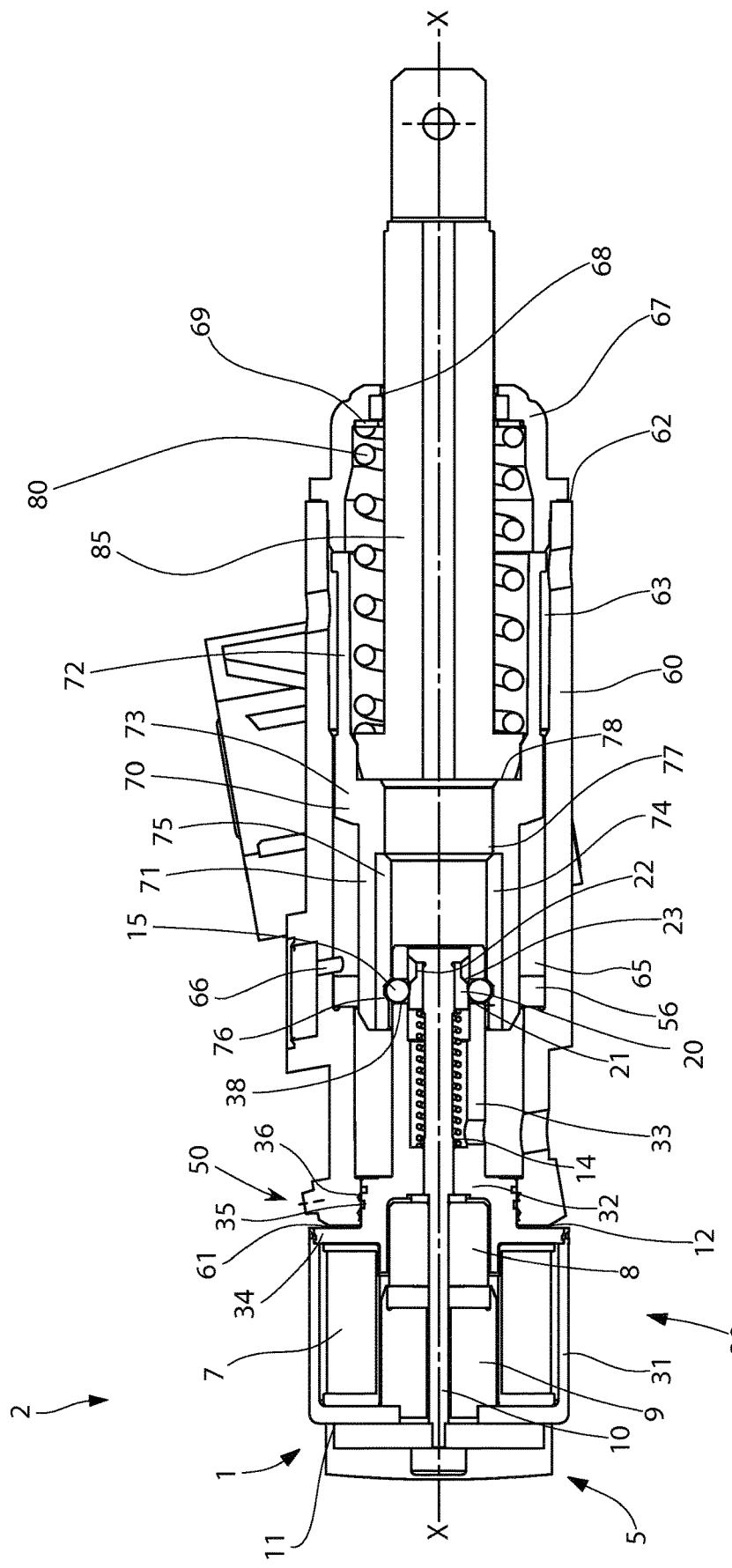
FIG. 4 shows a further development of the park lock according to FIGS. 1 to 3.
Figure 5:
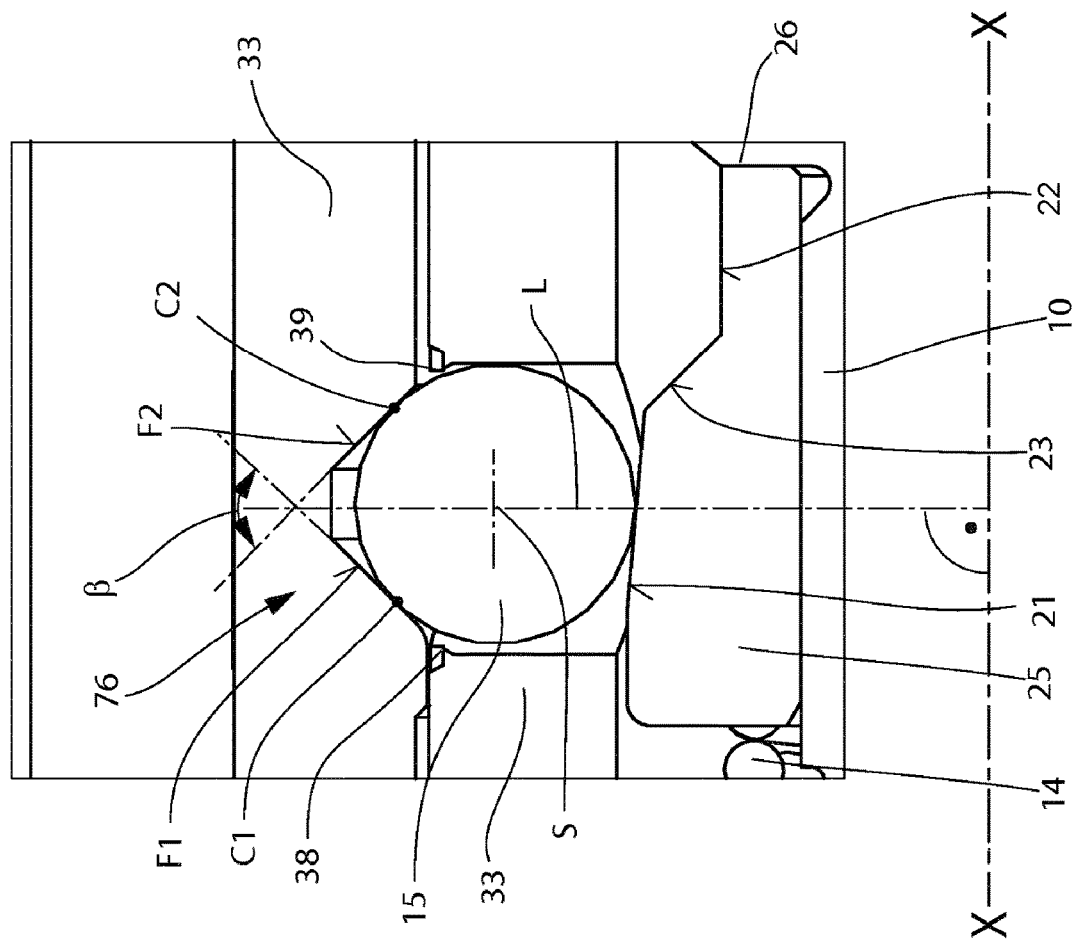
FIG. 5 shows an enlarged illustration of the latching link of the park lock according to FIG. 4.

FIG. 4 shows a further development of the park lock 2 according to FIGS. 1 to 3. The park lock 2 shown in FIG. 4 differs from the park lock 2 described above in the design of the sliding bush 75 or the latching link 74.

As illustrated in the further development shown, the sliding bush 75 can only have a first notch 76, in which the locking element 15 for fixing the cylinder 70 in the first position—as described above—is formed. The second notch 76 can be formed by an end section of the sliding bush 75 and the piston 70, whereby material savings and a further reduction in weight can be achieved.

The notch 76 is trapezoidal and has two surfaces F1, F2, each with a contact area C1 and C2. At the respective contact areas C1 and C2, the locking element 15 makes contact with the notch 76 when it engages in the latching link 74.

The notch 76 has an open side on the side facing the longitudinal axis X-X, the length of which—measured parallel to the longitudinal axis X-X—is smaller than the length of the locking element 15, also measured parallel to the longitudinal axis X-X. It can also be seen that the two surfaces F1 and F2 are arranged inclined in relation to one another and enclose an opening angle β of approximately 90°. The notch 76 tapers with increasing distance from the longitudinal axis X-X.

When the locking element 15 engages in the notch 76, the two contact areas C1 and C2 are arranged spaced apart from a line L. The line L projects radially or perpendicularly from the longitudinal axis X-X and runs through a geometric center point S of the locking element. In the present case, the two contact areas C1 and C2 are arranged in the longitudinal axis X-X on opposite sides of the line L.

The locking element 15 can be designed as desired, but a locking ball with a substantially constant diameter is preferred. In this case, a line runs through the center point S of the locking ball and the two contact areas C1 and C2 are arranged on both sides and at a distance from the line. The distance in the longitudinal axis X-X of the two contact areas C1 and C2 is smaller than the diameter of the locking ball and greater than approximately 1/10 of the diameter of the locking ball.

If the locking element 15 contacts the contact areas C1, C2, which ideally are also contact points, neglecting deformations and friction, the notch 76, a resulting force in these contact areas C1, C2 does not act parallel or perpendicular to the longitudinal axis X-X, but preferably at an angle of about 45° to the longitudinal axis, whereby the force for unlocking the locking device 1 of the park lock 2 is reduced.

LIST OF REFERENCE NUMERALS

1 Lock actuator
2 Park lock
5 Actuator
7 Coil
8 Armature
9 Pole cover
10 Actuating element
11 First side
12 Second side
14 Return spring
15 Locking element
20 Locking slotted guide
21 First surface
22 Second surface
23 Wedge surface
25 Sleeve
26 Flange
30 Actuator housing
31 First housing section
32 Second housing section
33 Housing sleeve
34 Flange
35 Shoulder
36 Undercut
38 Recess
39 Retaining edge
50 Connection point
56 Seal
60 Cylinder housing
61 First side
62 Second side
63 Through opening
65 Pressure chamber
66 Control opening
67 Cover
68 Through opening
69 Spring plate
70 Cylinder
71 First section
72 Second section
73 Transition region
74 Latching link
75 Sliding bush
76 First notch
77 Second notch
78 Spring shoe
80 Compression spring
85 Park lock tappet
C1 Contact area
C2 Contact area
D Distance
F Surface
L Line
M1 First gradient of 23
M2 Second gradient of 21 and/or 22
P Contact point
S Geometric center point of 15

X-X Longitudinal axis
β Opening angle

The invention claimed is:

1. An electromagnetic lock actuator (1) for a park lock (2), which is arranged in a longitudinal axis (X-X), comprising:
an electromechanically movable and actuatable actuating element (10), which can be moved into a first position (A) and into a second position (B) and comprises a locking slotted guide (20), the locking slotted guide (20) comprising a sleeve, the sleeve being arranged on the actuating element (10); and
at least one locking element (15) which is held displaceably relative to the locking slotted guide (20) to fix a cylinder (70) in the first position (A),
wherein the locking slotted guide (20) has a first surface (21) and a second surface (22), which are connected to a gradient (M1) by a wedge surface (23),
wherein the first surface (21) contacts the at least one locking element (15) in the first position (A), and wherein the second surface (22) contacts the at least one locking element (15) in the second position (B),
wherein the first surface (21) is inclined in relation to the wedge surface (23) with a second gradient (M2),
wherein a return spring (14) is provided, the return spring (14) holding the actuating element (10) in a preloaded actuator starting position in the first position (A),
wherein the slotted guide (20) is held against a flange (26) of the actuating element (10) by means of the return spring (14), such that the first surface (21) forces the at least one locking element (15) to fix the cylinder (70) in the first position (A), and
wherein the at least one locking element (15) is held within at least one notch (76, 77) of a sliding bush (75) in the first position (A), the at least one notch (76, 77) being defined by at least one surface such the at least one locking element (15) simultaneously contacts the at least one surface at two contact areas (C1, C2) in the first position (A).

2. The lock actuator (1) according to claim 1, characterized in that the gradient (M1) of the wedge surface (23) and the second gradient (M2) of said first surface is at most 2:1.

3. The lock actuator (1) according to claim 1, characterized in that the gradient (M1) of the wedge surface (23) and the second gradient (M2) of said first surface points in the same direction.

4. The lock actuator (1) according to claim 1, characterized in that the actuating element (10) is linearly movable in the longitudinal axis (X-X), or that the actuating element (10) is rotatable about the longitudinal axis (X-X).

5. The lock actuator (1) according to claim 1, characterized in that an actuator housing (30) is provided, and that the actuating element (10) and the at least one locking element (15) are mounted in the actuator housing.

6. The lock actuator (1) according to claim 1, characterized in that the at least one locking element (15) is a locking ball.

7. A park lock (2), with the lock actuator (1) according to claim 1, wherein the cylinder (70) can be lifted in the longitudinal axis (X-X).

8. The park lock (2) according to claim 7, characterized in that the at least one notch (76, 77) is formed in the sliding bush (75), and wherein the two contact areas (C1, C2) are spaced apart from a line (L) which runs through a geometric center point (S) of said at least one locking element (15).

9. The park lock (2) according to claim 8, characterized in that the two contact areas (C1, C2) are arranged in the longitudinal axis (X-X) on opposite sides of the line (L).

10. The park lock (2) according to claim 8, characterized in that the at least one notch (76, 77) is U-, V- or trapezoid-shaped.

11. A motor vehicle with automatic transmission, having at least one park lock (2) according to claim 7.

12. A park lock (2) for use in a motor vehicle with automatic transmission, with the lock actuator (1) according to claim 1, wherein the cylinder (70) can be lifted in the longitudinal axis (X-X).

* * * * *